United States Patent
Mizutani et al.

(10) Patent No.: US 9,618,608 B2
(45) Date of Patent: Apr. 11, 2017

(54) TARGET DETECTION APPARATUS AND VEHICLE CONTROL SYSTEM

(71) Applicant: DENSO CORPORATION, Kariya, Aichi-pref. (JP)

(72) Inventors: Akiyoshi Mizutani, Nagoya (JP); Keiji Matsuoka, Kariya (JP); Koji Shimizu, Ichinomiya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 0 days.

(21) Appl. No.: 14/783,603

(22) PCT Filed: Mar. 26, 2014

(86) PCT No.: PCT/JP2014/058479
§ 371 (c)(1),
(2) Date: Oct. 9, 2015

(87) PCT Pub. No.: WO2014/168002
PCT Pub. Date: Oct. 16, 2014

(65) Prior Publication Data
US 2016/0084942 A1  Mar. 24, 2016

(30) Foreign Application Priority Data

Apr. 11, 2013  (JP) ................. 2013-082995

(51) Int. Cl.
*G01S 7/41* (2006.01)
*G08G 1/16* (2006.01)
(Continued)

(52) U.S. Cl.
CPC .............. *G01S 7/41* (2013.01); *B60K 35/00* (2013.01); *B60W 30/16* (2013.01); *G01S 13/04* (2013.01);
(Continued)

(58) Field of Classification Search
CPC .......... G01S 7/41; G01S 13/04; G01S 13/345; G01S 13/72; G01S 13/931; B60K 35/00; B60W 30/16
See application file for complete search history.

(56) References Cited

U.S. PATENT DOCUMENTS

| | | |
|---|---|---|
| 5,710,565 A | 1/1998 | Shirai et al. |
| 5,734,344 A | 3/1998 | Yamada |

(Continued)

FOREIGN PATENT DOCUMENTS

| | | |
|---|---|---|
| JP | H08-279099 A | 10/1996 |
| JP | H08-313626 A | 11/1996 |

(Continued)

OTHER PUBLICATIONS

International Preliminary Report on Patentability; International Application No. PCT/JP2014/058479; Filed: Mar. 26, 2014 (with English translation).

(Continued)

*Primary Examiner* — Michael D Lang
(74) *Attorney, Agent, or Firm* — Knobbe, Martens, Olson & Bear, LLP

(57) ABSTRACT

A target detection apparatus counts the number of reflection points, taking a reflection point of interest as being a target reflection point, for each detected reflection point, the reflection points being present in a target area that is set with reference to the target reflection point and each having a difference in speed from the target reflection point, the difference being not more than a preset identical speed determination threshold, and extracts a parallel-running pair that is a pair of the reflection points that meet preset parallel-running conditions. The target detection apparatus determines that the two reflection points configuring the parallel-running pair originate from an identical target, when a count value is not less than a preset size determination (Continued)

threshold, the count value being of at least either of the two reflection points configuring the extracted parallel-running pair and generates target information reflecting the determination results.

16 Claims, 3 Drawing Sheets

(51) Int. Cl.
    *G01S 13/34* (2006.01)
    *G01S 13/58* (2006.01)
    *G01S 13/72* (2006.01)
    *G01S 13/93* (2006.01)
    *B60W 30/16* (2012.01)
    *B60K 35/00* (2006.01)
    *G01S 13/04* (2006.01)

(52) U.S. Cl.
    CPC .......... *G01S 13/345* (2013.01); *G01S 13/584* (2013.01); *G01S 13/72* (2013.01); *G01S 13/931* (2013.01); *G08G 1/16* (2013.01); *G08G 1/165* (2013.01); *G08G 1/166* (2013.01); *B60W 2550/10* (2013.01); *B60W 2550/308* (2013.01); *G01S 2013/9321* (2013.01); *G01S 2013/9325* (2013.01)

(56) References Cited

U.S. PATENT DOCUMENTS

| | | |
|---|---|---|
| 5,806,019 A | 9/1998 | Ishiyama |
| 5,929,803 A | 7/1999 | Uehara et al. |
| 2013/0207834 A1 | 8/2013 | Mizutani et al. |

FOREIGN PATENT DOCUMENTS

| | | |
|---|---|---|
| JP | H09-145833 A | 6/1997 |
| JP | H11-72557 A | 3/1999 |
| JP | 2001-080437 A | 3/2001 |
| JP | 2004-020492 A | 1/2004 |
| JP | 2013-164390 A | 8/2013 |
| WO | 2014/168002 A1 | 10/2014 |

OTHER PUBLICATIONS

International Search Report (translated version); International Application No. PCT/JP2014/058479, filed Mar. 26, 2014; 10 pages.

TARGET DETECTION APPARATUS AND VEHICLE CONTROL SYSTEM

CROSS-REFERENCE TO RELATED APPLICATION

This application is a U.S. National Phase Application under 35 U.S.C. 371 of International Application No. PCT/JP2014/058479 filed on Mar. 26, 2014 and published in Japanese as WO 2014/168002 A1 on Oct. 16, 2014. This application is based on and claims the benefit of priority from Japanese Patent Application No. 2013-082995, filed Apr. 11, 2013. The entire disclosures of all of the above applications are incorporated herein by reference.

TECHNICAL FIELD

The present invention relates to a target detection apparatus that generates information related to a target present around a vehicle, and a vehicle control system that uses the information generated by the target detection apparatus.

BACKGROUND ART

Target detection apparatuses are known as detection apparatuses that are used while mounted to vehicles. Such a target detection apparatus periodically emits radar waves (e.g., laser waves or millimeter waves) as transmission waves, across a predetermined angle around the vehicle, and receives reflected waves to detect various targets present around the vehicle. This type of target detection apparatus is applied to a system that performs vehicle control, such as so-called automatic cruise control (adaptive cruise control (ACC)). Under the automatic cruise control, a vehicle (preceding vehicle) that travels ahead of the own vehicle in the same traffic lane is detected and the vehicle speed is controlled so as to keep an inter-vehicle distance constant, or, when there is no preceding vehicle, the vehicle speed is controlled so as to keep a predetermined constant speed (e.g., see PTL 1).

CITATION LIST

Patent Literature

[PTL 1] JP-A-H08-279099

SUMMARY OF INVENTION

Technical Problem

Let us discuss the case where a preceding vehicle is a large-size vehicle, such as a double-decker car-carrier not loaded with vehicles as cargo, which strongly reflects radar waves from two points near both ends in a vehicle width direction, and where the two reflection points are apart from each other more than the vehicle width of a generally used normal passenger car. In this case, a conventionally used target detection apparatus suffers from a problem that there is a probability that the two reflection points are detected as being those of separately present targets (e.g., two vehicles parallelly traveling in both nearest traffic lanes adjacent to the own traffic lane). Further, when such erroneous detection is made, under ACC, there is also a problem that the own vehicle may be determined to be able to pass between the two targets and the vehicle may be controlled accordingly.

To solve the above problems, an object of the present invention is to prevent erroneous detection of a large-size target in which a plurality of reflection points of strongly reflecting radar waves are present.

Solution to Problem

A target detection apparatus of the present invention is mounted to a vehicle, and receives reflected waves of radar waves transmitted towards the outside of the vehicle to generate information related to a target that has reflected the radar waves. The target detection apparatus includes a reflection point position detecting means, a target information generating means, a counting means, a parallel-running pair extracting means, and a determining means.

The reflection point position detecting means transmits and receives radar waves to detect the position of a reflection point that has reflected the radar waves. The counting means counts the number of reflection points, taking a reflection point of interest as being a target reflection point, for each reflection point detected by the reflection point position detecting means, the reflection points being present in a target area that is set with reference to the target reflection point and is likely to include reflection points originating from an identical target, the reflection points each having a difference in speed from the target reflection point, the difference being not more than a preset identical speed determination threshold. The extracting means extracts a parallel-running pair that is a pair of the reflection points that meet preset parallel-running conditions. The determining means determines that the two reflection points configuring the parallel-running pair originate from an identical target, when a count value is not less than a preset size determination threshold, the count value being derived from the counting means for at least either of the two reflection points configuring the parallel-running pair extracted by the parallel-running pair extracting means. The target information generating means generates target information reflecting the determination results (information related to a target that has reflected the radar waves) of the determining means, according to the detection results of the reflection point position detecting means.

Specifically, as the size of a target that causes a target reflection point increases, the number of reflection points (that are likely to originate from an identical target) increases, the reflection points being detected around a target reflection point and being at a speed identical with that of the target reflection point. Therefore, when the count value is greater than the size determination threshold, the target that has caused the reflection points, which are subjected to counting, has a high probability of being a large-size target (e.g., a large-size vehicle) with a width greater than that of the own vehicle. Accordingly, when the count value of at least either of the reflection points configuring the parallel-running pair exceeds the size determination threshold, the parallel-running pair may be determined to originate from an identical target.

According to the present invention configured as described above, when the two reflection points configuring a parallel-running pair originate from an identical target, the two reflection points are prevented from being erroneously detected as being those originating from two separate targets. Further, in a vehicle control system that performs automatic cruise control, control is prevented from being performed on the assumption of there being a space between two targets which the vehicle can travel through.

The bracketed reference numbers in the claims indicate correlation with specific means provided in an embodiment which is described hereafter as one aspect, and should not be construed as limiting the technical scope of the present invention.

The present invention can be realized not only in the form of the above target detection apparatus and the vehicle control system that includes the target detection apparatus as a constituent element, but also in various modes, such as a program for enabling a computer to function as the individual means configuring the target detection apparatus, a target detection method, and a vehicle control method.

DESCRIPTION OF EMBODIMENTS

An embodiment of the present invention will hereinafter be described with reference to the drawings.

[Overall Configuration]

Figure 1:
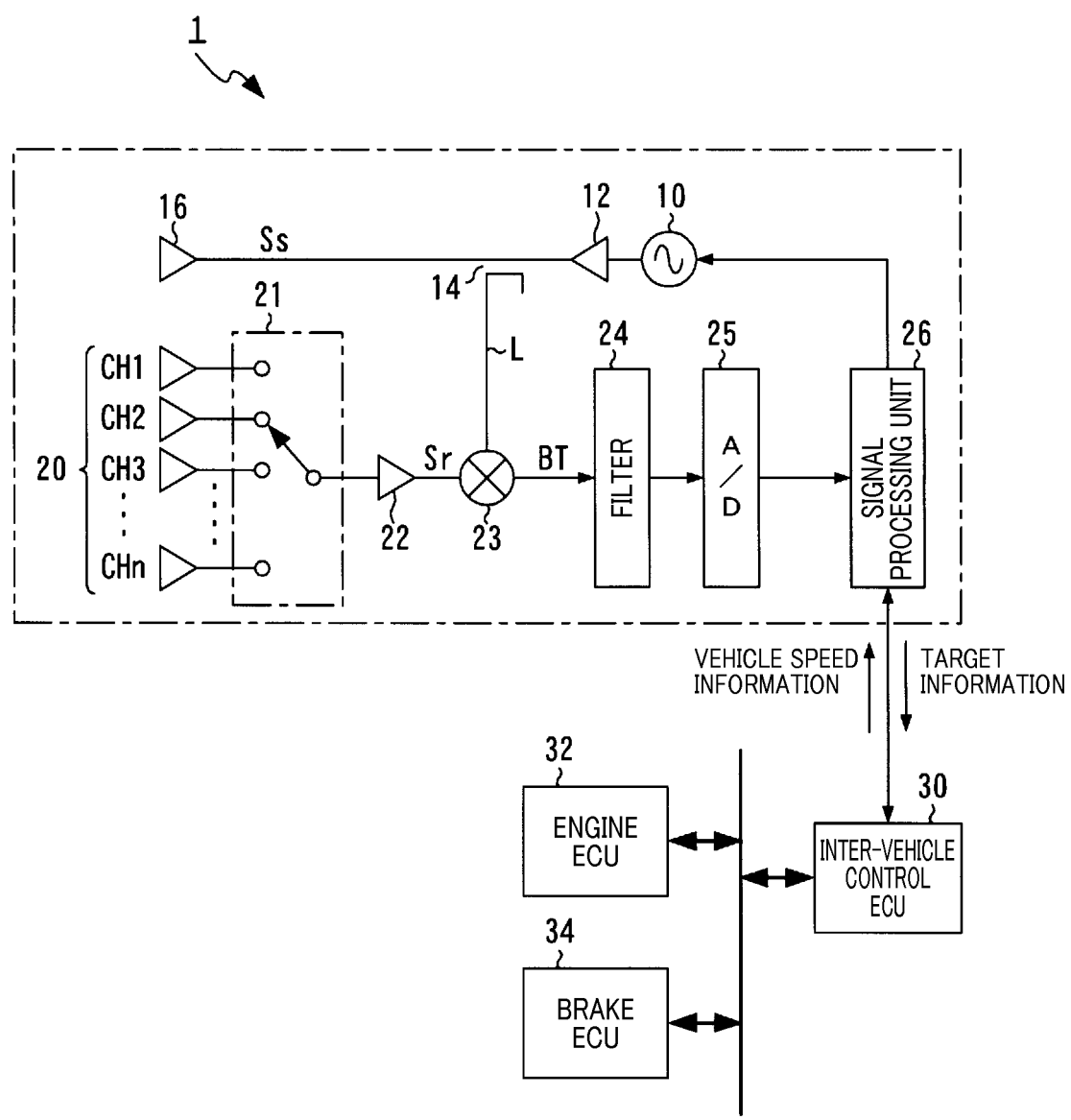
FIG. 1 is a block diagram illustrating a configuration of a vehicle control system.

A vehicle control system to which the present invention is applied is mounted to a vehicle. As shown in FIG. 1, the vehicle control system includes an inter-vehicle control electronic control unit (referred to, hereafter, as an "inter-vehicle control ECU") 30, an engine electronic control unit (referred to, hereafter, as an "engine ECU") 32, and a brake electronic control unit (referred to, hereafter, as a "brake ECU") 34, which are connected to each other via a LAN (local area network) communication bus. Each of the ECUs 30, 32 and 34 is configured mainly by a known microcomputer, and includes at least a bus controller to perform communication via the LAN communication bus.

Furthermore, the inter-vehicle control ECU 30 is connected, for example, to an alert buzzer, a notification display unit such as a meter, a cruise control switch, and a target inter-vehicle distance setting switch, which are not shown, and is also connected to a radar sensor 1.

The radar sensor 1 is configured as a so-called "millimeter wave radar" that uses an FMCW (frequency modulated continuous wave) method. The radar sensor 1 transmits and receives millimeter waveband radar waves that have been frequency-modulated to thereby detect the position of a reflection point from which the radar waves are reflected. According to the detection results, the radar sensor 1 recognizes targets, such as vehicles and roadside objects, and generates target information related to the recognized targets, for transmission to the inter-vehicle control ECU 30. The target information includes a distance to a target, relative speed, and an azimuth in which the target is present, as well as a large-size flag that indicates whether the target is a large-size target having a lateral width greater than that of a normal passenger car (passenger car of a predetermined lateral width).

The brake ECU 34 transmits a brake pedal state to the inter-vehicle control ECU 30. The brake pedal state is determined on the basis of not only detection information (steering angle and yaw rate) from a steering sensor and a yaw rate sensor, which are not shown, but also information from an M/C (master cylinder) pressure sensor, not shown. Further, the brake ECU 34 receives target acceleration, brake request, and the like from the inter-vehicle control ECU 30, and controls braking force by activating a brake actuator for opening/closing a pressure increase control valve and a pressure decrease control valve provided in a brake hydraulic circuit, according to the received information and determined braking state.

The engine ECU 32 transmits detection information (vehicle speed, engine control state, and accelerator operation state) derived from a vehicle speed sensor, a throttle opening sensor, and an accelerator pedal opening sensor, which are not shown, to the inter-vehicle control ECU 30. Further, the engine ECU 32 receives target acceleration, fuel cut requests, and the like from the inter-vehicle control ECU 30, and outputs activation commands, for example, to a throttle actuator that regulates the throttle opening of an internal combustion engine on the basis of an operating state specified from the received information.

The inter-vehicle control ECU 30 receives the vehicle speed and engine control state from the engine ECU 32, and receives the steering angle, yaw rate, brake control state, and the like from the brake ECU 34. Further, the inter-vehicle control ECU 30 transmits a target acceleration, a fuel cut request, and the like to the engine ECU 32, and transmits the target acceleration, a brake request, and the like to the brake ECU 34, as control commands to adjust the inter-vehicle distance relative to a preceding vehicle to an appropriate distance. The adjustment is made based on the set values of the cruise control switch, the target inter-vehicle setting switch, and the like, and target information received from the radar sensor 1. Furthermore, the inter-vehicle control ECU 30 makes a determination as to alert generation and, when necessary, sounds the alert buzzer. As required, the inter-vehicle control ECU 30 displays, in the notification display unit, an icon or a mark indicating that a target, which is a preceding vehicle, is a large-size target having a lateral width greater than that of a normal passenger car (passenger car of a predetermined lateral width).

[Configuration of Radar Sensor]

The following description deals with details of the radar sensor 1.

The radar sensor 1 includes an oscillator 10, an amplifier 12, a distributor 14, a transmission antenna 16, and a reception antenna unit 20. The oscillator 10 generates a millimeter waveband high-frequency signal which is modulated to have a rising period during which the frequency linearly increases relative to time, and a falling period during which the frequency linearly decreases. The amplifier 12 amplifies the high-frequency signal generated by the oscillator 10. The distributor 14 distributes power of the output from the amplifier 12 to a transmission signal Ss and a local signal L. The reception antenna unit 20 is composed of the distributor 14, the transmission antenna 16 that emits radar waves in accord with the transmission signal Ss, and an n number of reception antennas that receive the radar waves.

The radar sensor 1 includes a reception switch 21, an amplifier 22, a mixer 23, a filter 24, an A/D (analog-to-digital) converter 25, and a signal processing unit 26. The reception switch 21 successively selects any of the antennas configuring the reception antenna unit 20, and supplies the reception signal Sr from the selected antenna to the subsequent stage. The amplifier 22 amplifies the reception signal Sr supplied from the reception switch 21. The mixer 23 mixes the reception signal Sr amplified by the amplifier 22 with the local signal L, to generate a beat signal BT. The filter 24 removes unnecessary signal components from the beat signal BT generated by the mixer 23. The A/D converter 25 samples the output of the filter 24, for conversion to digital data. The signal processing unit 26 performs processes of controlling start or stop of the A/D converter 25 and the oscillator 10, and of sampling a beat signal BT via the A/D converter 25. The signal processing unit 26 also performs, for example, signal processing using the sampled data, and communicates with the inter-vehicle control ECU 30 to transmit and receive the information (vehicle speed information) necessary for the signal processing and the information (e.g., target information) obtained as a result of the signal processing.

Of these, the antennas configuring the reception antenna unit 20 are each set such that the beam width includes a full beam width of the transmission antenna 16. The antennas are respectively assigned to CH1 to CHn.

The signal processing unit 26 is mainly configured by a known microcomputer, and further includes an arithmetic processing unit, such as a DSP (digital signal processor), for performing a fast Fourier transform (FFT) process and the like on data retrieved via the A/D converter 25.

[Operations of the Radar Sensor]

In the radar sensor 1 of the present embodiment configured as described above, when the oscillator 10 is activated according to a command from the signal processing unit 26, a high-frequency signal generated by the oscillator 10 and amplified by the amplifier 12 is power-distributed by the distributor 14 to thereby generate the transmission signal Ss and the local signal L. Of the signals, the transmission signal Ss is transmitted via the transmission antenna 16 as radar waves.

Then, reflected waves that have been reflected and returned by a target after being sent out from the transmission antenna 16 are received by all of the reception antennas configuring the reception antenna unit 20. Only the reception signal Sr from a reception channel CHi (i=1 to n) selected by the reception switch 21 is supplied to the mixer 23 after being amplified by the amplifier 22. The mixer 23 then mixes the reception signal Sr with the local signal L from the distributor 14, thereby generating a beat signal BT. The beat signal BT, after being removed with unnecessary signal components by the filter 24, is sampled by the A/D converter 25 and retrieved by the signal processing unit 26.

The reception switch 21 is switched such that all of the channels CH1 to CHn are each selected by a predetermined number of times (e.g., 512 times) during a single modulation cycle of the radar waves. The A/D converter 25 performs sampling synchronously with the switching timing. In other words, during a single modulation cycle of the radar waves, sampled data are accumulated for each of the channels CH1 to CHn and for each rising/falling period.

[Target Detection Process]

Figure 2:
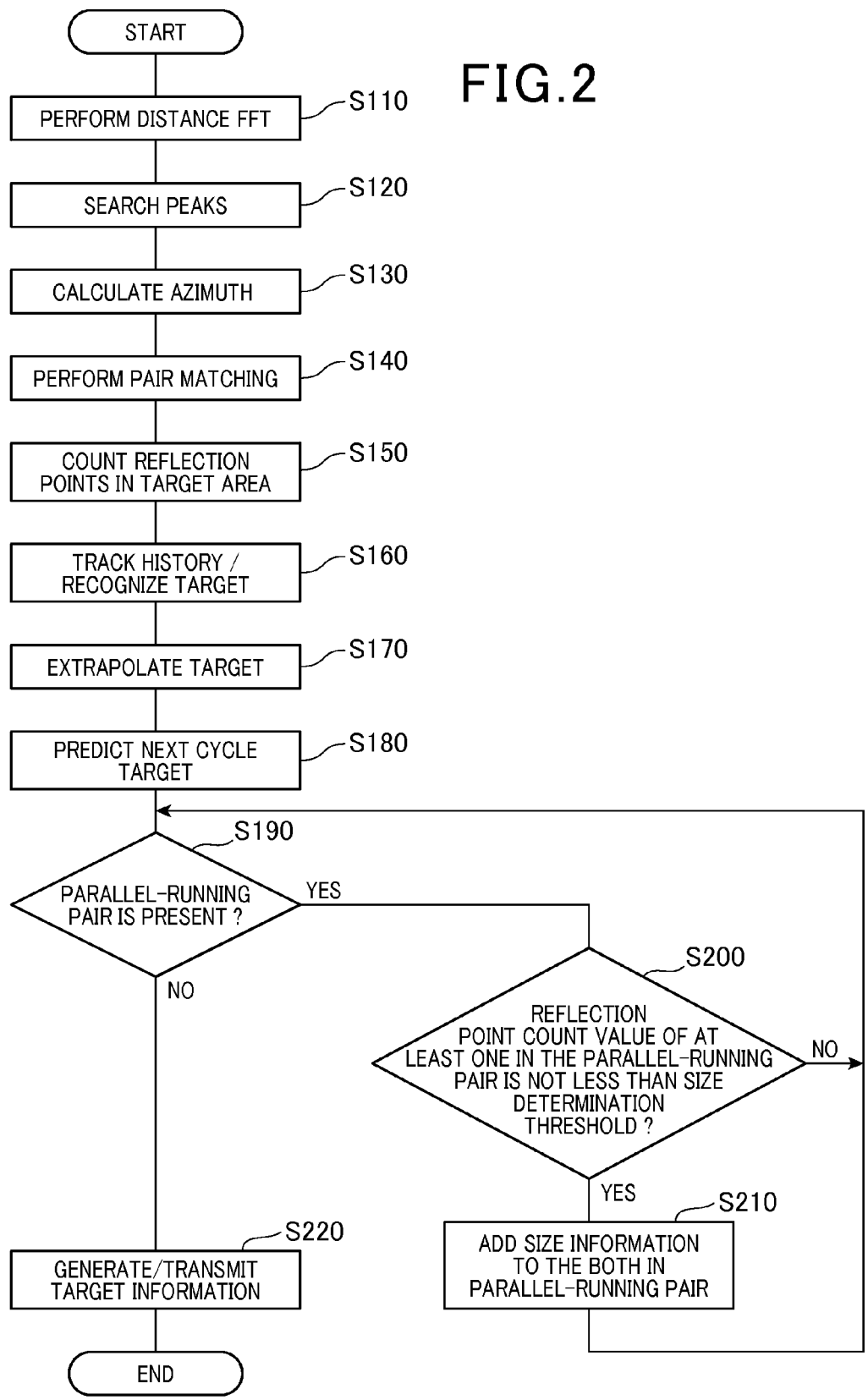
FIG. 2 is a flowchart illustrating a target detection process performed by a signal processing unit.

Referring to the flowchart of FIG. 2, a target detection process performed by the signal processing unit 26 will be described. A ROM (read-only memory) that configures the signal processing unit 26 stores therein at least a program for this process.

The present process is repeatedly started up, with the single modulation cycle of the radar waves as being a measurement cycle.

When the present process is started up, at step S110, the signal processing unit 26 performs a frequency analysis process (the FFT process, herein) on the sampled data corresponding to a single modulation cycle which are accumulated in the previous measurement cycle, and calculates a power spectrum of the beat signal BT for each of the channels CH1 to CHn and for each rising/falling period of the radar waves.

At step S120, the signal processing unit 26 performs a peak search to extract frequency components that form peaks in the power spectrum calculated at step S110 (referred to, hereafter, as "peak frequency components"). The peak frequency components extracted through the peak search include those which are compatible with a predicted value at step S180, described hereafter, and those which are not. Furthermore, when there are no peak frequency components compatible with the predicted value, peak frequency components are taken as being embedded in noise or in different peak frequency components, and accordingly peak frequency components are extrapolated. Being compatible refers to a match in a preset allowable range. Further, the signal level of the extrapolated peak frequency components is set to zero or noise level.

At step S130, the signal processing unit 26 performs an azimuth calculation process to obtain the incoming direction of the reflected wave that has generated the peak frequency, for each peak frequency component (excluding extrapolated frequency components) extracted at step S120 and for each modulation period. Specifically, the signal processing unit 26 performs a frequency analysis process (e.g. the FFT process or a MUSIC (super-resolution process, such as multiple signal classification) herein) on the n number of peak frequency components of the same frequency, collected from the channels CH1 to CHn.

At step S140, a pair matching process is performed to set a combination of a peak frequency component during up-modulation and a peak frequency component during down-modulation extracted at step S120. Specifically, peak frequency components extracted at step S120 are combined, ensuring that signal levels and incoming directions of the components calculated at step S130 substantially match with each other (the difference between the both is not more than a preset match determination threshold). Furthermore, for each combination that has been set, the distance and relative speed are calculated using a technique known in FMCW radars to register, as formal pairs, only the components whose calculated distances and calculated speeds are less than a preset upper limit distance and upper limit speed. The positions indicated by each registered pair correspond to the positions of reflection points that are present on targets which have reflected the radar waves, and thus the registered pair is also referred to, hereafter, as reflection points.

Figure 3:
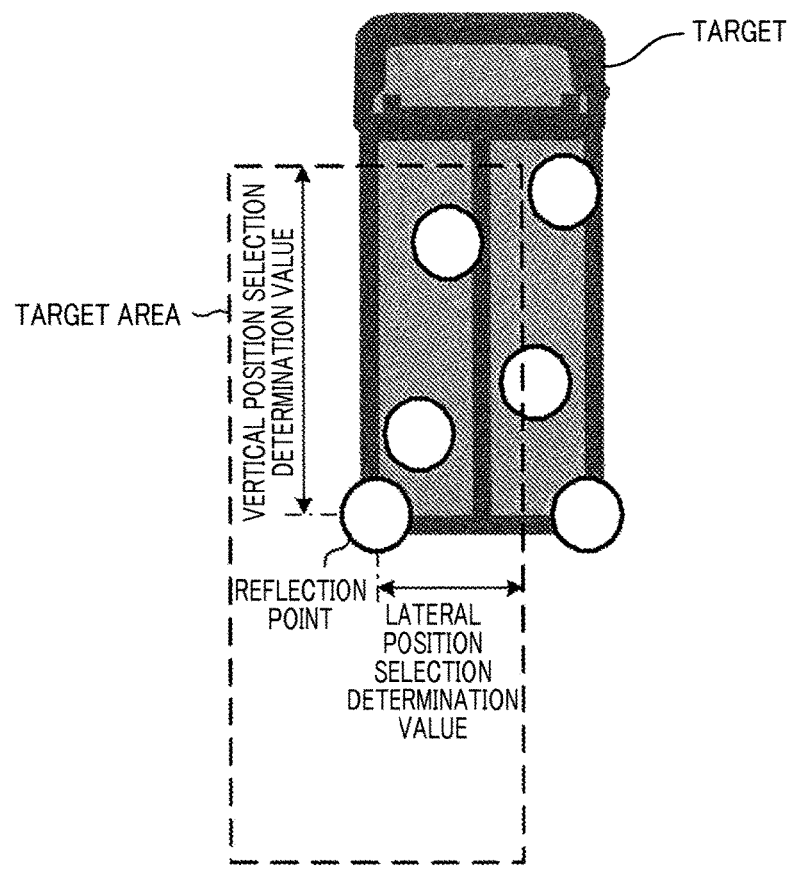
FIG. 3 is an explanatory diagram exemplifying reflection points on a large-size target and a target area that is subjected to a reflection point count.

At step S150, for each pair (reflection points) registered at step S140, the signal processing unit 26 counts the number of reflection points. The reflection points to be counted are those which are present in a target area that is set with reference to a target reflection point as a reflection point of interest, and those which have a difference in speed from the target reflection point, the difference being not more than a preset identical speed determination threshold (e.g., 5 km/s). Hereafter, the count value is referred to as a reflection point count value. As the target area, a rectangular area is used. In the rectangular area to be used, the difference in vertical position from a target reflection point is not more than a preset vertical position selection determination value (5 m in the present embodiment), and the differen in lateral position from the target reflection point is not more than a preset lateral position selection determination value (1 m in the present embodiment) (see FIG. 3). However, the vertical position selection determination value and the lateral position selection determination value are set so as to cover an area in which reflection points originating from a target that is identical with the one for a target reflection point are likely to be detected.

At step S160, for each pair registered at S140 of the measurement cycle of this time (referred to, hereafter, as a "present cycle pair"), a history tracking process is performed to determine whether or not the present cycle pair indicates a target identical with the one for a pair registered at step S140 of the previous measurement cycle (referred to, hereafter, as a "previous cycle pair") (whether there is a historical connection).

Specifically, the signal processing unit 26 calculates a predicted position and a predicted speed of a present cycle pair corresponding to the previous cycle pair, based on information on the previous cycle pair. When the differences (position difference and speed difference) of the predicted position and the predicted speed, from the detected position and the detected speed calculated from the present cycle pair are less than upper limit values (upper limit position difference and upper limit speed difference), it is determined that there is a historical connection. If a pair is determined to have a historical connection over a plurality of measurement cycles (e.g., five cycles), the pair is recognized to be a target. The present cycle pair successively inherits the information (e.g., the number of times of historical connections, an extrapolation counter, and an extrapolation flag described hereafter) of the historically connected previous cycle pair.

At step S170, the signal processing unit 26 sets the target recognized at step S160 of the present cycle as a present cycle target and the target recognized at step S160 of the previous cycle as a previous cycle target. When there is a previous cycle target that is not historically connected to the present cycle target, an extrapolation pair is generated based on a predicted value in respect of the previous cycle target to perform a target extrapolation process in which the extrapolation pair is added to the present cycle target.

Each present cycle target is set with an extrapolation flag indicating whether extrapolation has been performed or not, and an extrapolation counter indicating the number of successive extrapolations. When the present cycle target is an actual pair that has actually been detected, the extrapolation flag and the extrapolation counter are cleared back to zero. When the present cycle target is an extrapolation pair, the extrapolation flag is set to 1, and the extrapolation counter is incremented. When the count value of the extrapolation counter reaches a preset destruction threshold, the target is destroyed as having been lost.

At step S180, for each of the present cycle targets registered at steps S160 and S170, a subsequent cycle target prediction process is performed to calculate a peak frequency to be detected and an azimuth angle to be detected at the subsequent cycle.

At step S190, it is determined whether or not there are pairs of targets (in other words, reflection points) that meet preset parallel-running conditions (referred to, hereafter, as "parallel-running pair(s)") among the present cycle targets registered at steps S160 and S170. Specifically, it is determined that the parallel-running conditions are met if the distance between a parallel-running pair of interest is within a preset distance determination threshold (3 m in the present embodiment), and the difference in distance from the own vehicle to each reflection point of the parallel-running pair is not more than a preset parallel-running determination threshold (1 m in the present embodiment). However, the distance determination threshold is set so as to be at least greater than the lateral position selection determination value, or so as to be approximately the width of a standard traffic lane.

If it is determined that a parallel-running pair is present (YES at step S190), control proceeds to step S200. At step S200, it is determined whether or not the reflection point count value of at least either of the two present cycle targets configuring the parallel-running pair is not less than a preset size determination threshold (e.g., 6). The size determination threshold is preset to a value that enables determination of whether or not a target is of a large size having a width greater than the width of the own vehicle, based on experimental results and the like. The size determination threshold may be 1. In other words, a target may be determined to be of a large size if one or more reflected waves that meet the predetermined conditions indicated at step S150 are present (counted).

When at least either of the reflection point count values is not less than the size determination threshold (YES at step S200), control proceeds to step S210 to add size information to both present cycle targets configuring the parallel-running pair. The size information indicates that the target is of a large size in which another present cycle target originating from an identical target is present. Then, control returns to step S190. On the other hand, if it is determined that both reflection point count values are less than the threshold (NO at step S200), step S210 is skipped and then control returns to step S190. The processes at steps S190 to S210 are repeatedly performed for all parallel-running pairs.

When no parallel-running pairs are present at all, or the processes at steps S190 to S210 have been completed for all parallel-running pairs (NO at step S190), control proceeds to step S220. At step S220, target information is generated based on the present cycle targets, and the generated target information is transmitted to the inter-vehicle control ECU 30. Then, the present process is terminated.

However, in generating the target information, the following action is taken for the present cycle targets (parallel-running pair) to which the size information has been added. Specifically, the two present cycle targets are combined into a single target, taking the middle point therebetween as being the position of a target, and taking the distance therebetween as being the lateral width size of the target.

[Advantageous Effects of the Invention]

As described above, in the radar sensor 1, when a parallel-running pair is detected, whether the target causing the parallel-running pair is of a large size (e.g., a large-size vehicle) having a width greater than that of the own vehicle is estimated from the reflection point count values. If the target is estimated to be of a large size, the parallel-running pair is taken as originating from a single target and thus a single piece of target information is generated.

In some cases, a plurality of present cycle targets may be generated based on the waves reflected from a plurality of reflection points on an identical large-size vehicle, and the distance between the present cycle targets may be separated to an extent of allowing the own vehicle to pass therebetween. In such a case, the inter-vehicle control ECU 30 is prevented from making an erroneous detection of the targets as being two targets travelling in parallel. Therefore, safety and reliability of automatic cruise control can be improved.

[Other Embodiments]

An embodiment of the present invention has so far been described. However, it goes without saying that the present invention should not be construed as being limited to the foregoing embodiment, but can be implemented in various modes. For example, functions possessed by a single constituent element may be dispersed into a plurality of constituent elements, or the functions provided by a plurality of constituent elements may be integrated into a single constituent element. In addition, at least a part of the configuration of the foregoing embodiment may be replaced by a known configuration having the same functions.

According to the foregoing embodiment, reflection points are counted (step S150) after pair matching (step S140). However, it may be so configured that the reflection points are counted during the period following history tracking/target recognition (step S160) up to step S190. In this case, since the number of reflection points to be counted decreases due to the history tracking, processing load can be reduced.

According to the foregoing embodiment, at step S220, target information is generated, taking a parallel-running pair to which the size information has been added as being a single target. However, it may be so configured that target information including size information is generated for each of the present cycle targets (reflection points) configuring the parallel-running pair. In this case, the inter-vehicle control ECU 30 that receives target information may determine whether or not the own vehicle is able to pass between the parallel-running pair, on the basis of the size information to thereby carry out automatic cruise control on the basis of the determination results.

REFERENCE SIGNS LIST

1: radar sensor
10: oscillator
12: amplifier
14: distributor
16: transmission antenna
20: reception antenna unit
21: reception switch
22: amplifier
23: mixer
24: filter
25: A/D converter
26: signal processing unit
30: inter-vehicle control ECU
32: engine ECU
34: brake ECU

What is claimed is:

1. A target detection apparatus that is mounted to a vehicle, and receives reflected waves of radar waves transmitted towards the outside of the vehicle to generate information related to a target that has reflected the radar waves, the target detection apparatus comprising:
a processor, the processor being configured to:
transmit and receive radar waves to detect the position of a reflection point that has reflected the radar waves;
generate information related to a target that has reflected the radar waves, according to the position of the reflection point detected;
count the number of reflection points, taking a reflection point of interest as being a target reflection point, for each reflection point detected, the reflection points being present in a target area that is set with reference to the target reflection point and each having a difference in speed from the target reflection point, the difference being not more than a preset identical speed determination threshold;
extract a parallel-running pair that is a pair of the reflection points that meet preset parallel-running conditions;
determine that the two reflection points configuring the parallel-running pair originate from an identical target, when a count value is not less than a preset size determination threshold, the count value being derived from the number of reflection points counted for at least either of the two reflection points configuring the parallel-running pair extracted; and
generate target information reflecting that the two reflection points configuring the parallel-running pair are determined to originate from the identical target.

2. The target detection apparatus according to claim 1, wherein the processor is further configured to use, as the parallel-running conditions: that a distance between the parallel-running pair is not more than a distance determination threshold set to be wider than a width of the vehicle; that a difference in distance between the vehicle and each of reflection points configuring the parallel-running pair is not more than a parallel-running determination threshold; and a difference in speed between the parallel-running pair is not more than the identical speed determination threshold.

3. The target detection apparatus according to claim 2, wherein the processor is further configured to generate the target information related to a single target, from the parallel-running pair determined to originate from an identical target.

4. The target detection apparatus according to claim 2 wherein the processor is further configured to generate the target information for each reflection point and adds size information to the target information that is based on each of reflection points configuring the parallel-running pair to originate from an identical target, the size information indicating that a target is of a large size in which other target information that is based on an identical target is present.

5. The target detection apparatus according to claim 2, wherein when a target as a preceding vehicle is determined to be of a large size with a lateral width greater than that of a passenger car which has a predetermined lateral width, a pattern indicating a large-size target is displayed on a notification display unit.

6. The target detection apparatus according to claim 1, wherein the processor is further configured to generate the target information related to a single target, from the parallel-running pair determined to originate from an identical target.

7. The target detection apparatus according to claim 6, wherein when a target as a preceding vehicle is determined to be of a large size with a lateral width greater than that of a passenger car which has a predetermined lateral width, a pattern indicating a large-size target is displayed on a notification display unit.

8. The target detection apparatus according to claim 1, wherein the processor is further configured to generate the target information for each reflection point and adds size information to the target information that is based on each of reflection points configuring the parallel-running pair determined to originate from an identical target, the size information indicating that a target is of a large size in which other target information that is based on an identical target is present.

9. The target detection apparatus according to claim 8, wherein when a target as a preceding vehicle is determined to be of a large size with a lateral width greater than that of a passenger car which has a predetermined lateral width, a pattern indicating a large-size target is displayed on a notification display unit.

10. The target detection apparatus according to claim 1, wherein when a target as a preceding vehicle is determined to be of a large size with a lateral width greater than that of a passenger car which has a predetermined lateral width, a pattern indicating a large-size target is displayed on a notification display unit.

11. A vehicle control system comprising:
- a target detection apparatus that is mounted to a vehicle, and receives reflected waves of radar waves transmitted towards the outside of the vehicle to generate information related to a target that has reflected the radar waves; and
- a controller configured to perform automatic cruise control according to target information generated by the target detection apparatus,
- the target detection apparatus comprising:
- a processor, the processor being configured to:
- transmit and receive radar waves to detect the position of a reflection point that has reflected the radar waves;
- generate information related to a target that has reflected the radar waves, according to the position of the reflection point detected;
- count the number of reflection points, taking a reflection point of interest as being a target reflection point, for each reflection point detected, the reflection points being present in a target area that is set with reference to the target reflection point and each having a difference in speed from the target reflection point, the difference being not more than a preset identical speed determination threshold;
- extract a parallel-running pair that is a pair of the reflection points that meet preset parallel-running conditions; and
- determine that the two reflection points configuring the parallel-running pair originate from an identical target, when a count value is not less than a preset size determination threshold, the count value being derived from the number of reflection points counted for at least either of the two reflection points configuring the parallel-running pair extracted;
- generate target information reflecting that the two reflection points configuring the parallel-running pair are determined to originate from the identical target; and
- generate the target information for each reflection point and adding size information to the target information that is based on each of reflection points configuring the parallel-running pair to originate from an identical target, the size information indicating that a target is of a large size in which other target information that is based on an identical target is present,
- the controller being configured to perform the automatic cruise control, taking it as being impossible to pass between the parallel-running pair determined to originate from an identical target, according to the size information added to the target information.

12. The vehicle control system according to claim 11, wherein the processor is further configured to use, as the parallel-running conditions: that a distance between the parallel-running pair is not more than a distance determination threshold set to be wider than a width of the vehicle; that a difference in distance between the vehicle and each of reflection points configuring the parallel-running pair is not more than a parallel-running determination threshold; and a difference in speed between the parallel-running pair is not more than the identical speed determination threshold.

13. The vehicle control system according to claim 12, wherein when a target as a preceding vehicle is determined to be of a large size with a lateral width greater than that of a passenger car which has a predetermined lateral width, a pattern indicating a large-size target is displayed on a notification display unit.

14. The vehicle control system according to claim 11, wherein when a target as a preceding vehicle is determined to be of a large size with a lateral width greater than that of a passenger car which has a predetermined lateral width, a pattern indicating a large-size target is displayed on a notification display unit.

15. A target detection method that is mounted to a vehicle, and receives reflected waves of radar waves transmitted towards the outside of the vehicle to generate information related to a target that has reflected the radar waves, the method comprising:
- transmitting and receiving radar waves to detect the position of a reflection point that has reflected the radar waves;
- generating information related to a target that has reflected the radar waves, according to the detection results;
- counting the number of reflection points, taking a reflection point of interest as being a target reflection point, for each detected reflection point, the reflection points being present in a target area that is set with reference to the target reflection point and each having a difference in speed from the target reflection point, the difference being not more than a preset identical speed determination threshold;
- extracting a parallel-running pair that is a pair of the reflection points that meet preset parallel-running conditions;
- determining that the two reflection points configuring the parallel-running pair originate from an identical target, when a count value is not less than a preset size determination threshold, the count value being of at least either of the two reflection points configuring extracted parallel-running pair; and
- generating target information reflecting the determination results.

16. A vehicle control method that is mounted to a vehicle, and receives reflected waves of radar waves transmitted towards the outside of the vehicle to generate information related to a target that has reflected the radar waves, and performs automatic cruise control according to the generated target information, the method comprising:
- transmitting and receiving radar waves to detect the position of a reflection point that has reflected the radar waves;
- generating information related to a target that has reflected the radar waves, according to the detection results;
- counting the number of reflection points, taking a reflection point of interest as being a target reflection point, for each detected reflection point, the reflection points being present in a target area that is set with reference to the target reflection point and each having a difference in speed from the target reflection point, the difference being not more than a preset identical speed determination threshold;
- extracting a parallel-running pair that is a pair of the reflection points that meet preset parallel-running conditions;
- determining that the two reflection points configuring the parallel-running pair originate from an identical target, when a count value is not less than a preset size determination threshold, the count value being of at least either of the two reflection points configuring extracted parallel-running pair;

generating target information reflecting the determination results;

generating the target information for each reflection point and adding size information to the target information that is based on each of reflection points configuring the parallel-running pair determined to originate from an identical target, the size information indicating that a target is of a large size in which other target information that is based on an identical target is present; and performing the automatic cruise control, taking it as being impossible to pass between the parallel-running pair determined to originate from an identical target, according to the size information added to the target information.

* * * * *